United States Patent [19]

Agrawal et al.

[11] Patent Number: 4,493,021

[45] Date of Patent: Jan. 8, 1985

[54] MULTICOMPUTER COMMUNICATION SYSTEM

[75] Inventors: Anil K. Agrawal, Pasadena; Philip G. Mullen, Glendale; Vivatvong V. Vadakan, Pasadena, all of Calif.

[73] Assignee: The United States of America as represented by the Administrator of the National Aeronautics and Space Administration, Washington, D.C.

[21] Appl. No.: 250,585

[22] Filed: Apr. 3, 1981

[51] Int. Cl.³ .................. G06F 15/16; G06F 3/04
[52] U.S. Cl. .................................................... 364/200
[58] Field of Search ... 364/200 MS File, 900 MS File; 370/85

[56] References Cited

U.S. PATENT DOCUMENTS

| | | | |
|---|---|---|---|
| 3,480,914 | 11/1969 | Schlaeppi | 364/200 |
| 3,699,529 | 10/1972 | Beyers et al. | 364/200 |
| 4,032,899 | 6/1977 | Jenny et al. | 364/200 |
| 4,038,644 | 7/1977 | Duke et al. | 364/900 |
| 4,047,162 | 9/1977 | Dorey et al. | 364/200 |
| 4,063,220 | 12/1977 | Metcalfe et al. | 370/93 |
| 4,200,930 | 4/1980 | Rawlings et al. | 364/200 |
| 4,219,873 | 8/1980 | Kober et al. | 364/200 |
| 4,223,380 | 9/1980 | Antonaccio et al. | 364/200 |
| 4,228,496 | 10/1980 | Katzman et al. | 364/200 |
| 4,253,144 | 2/1981 | Bellamy et al. | 364/200 |
| 4,271,465 | 6/1981 | Ohtsuka et al. | 364/200 |
| 4,281,380 | 7/1981 | DeMesa et al. | 364/200 |
| 4,335,426 | 6/1982 | Maxwell et al. | 364/200 |

Primary Examiner—Eddie P. Chan
Attorney, Agent, or Firm—Paul F. McCaul; Thomas H. Jones; John R. Manning

[57] ABSTRACT

A local area network is provided for a plurality of autonomous computers (10) which operate at different rates and under different protocols coupled by network bus adapters (12) to a global bus (14). A host computer (HC) divides a message file to be transmitted into blocks, each with a header that includes a data type identifier and a trailer. The associated network bus adapter (NBA) then divides the data into packets, each with a header to which a transport header and trailer is added with frame type code which specifies one of three modes of addressing in the transmission of data, namely a physical address mode for computer to computer transmission using two bytes for source and destination addresses, a logical address mode and a data type mode. In the logical address mode, one of the two addressing bytes contains a logical channel number (LCN) established between the transmitting and one or more receiving computers. In the data type mode, one of the addressing bytes contains a code identifying the type of data. Every NBA initialized to accept specified types of data will automatically accept all data of the types it is conditioned to accept. Protocol handling is carried out by a module in each NBA.

5 Claims, 8 Drawing Figures

MULTICOMPUTER COMMUNICATION SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to apparatus for data communication between a plurality of computers connected to a common bus, and more particularly to such communication between autonomous computers which operate at different rates and under different protocols.

In many applications, both scientific and business, the growing use of digital computers for processing data has proliferated the volume of data to such an extent that often a plurality of computers are required, each devoted to a different task with a need for communications between the computers in order to carry out their respective tasks. One approach to a local area network system is centralized control, but that requires a dedicated computer for the control function. The alternative is distributed control where all host computers on the network will be monitoring the availability of the bus for data transmission. Obviously, two or more computers may transmit simultaneously resulting in collision of the data on the bus. This then requires detecting the collision and aborting the attempted transmission by all computers. While such an anticollision feature would be necessary in any distributed control system, that feature alone would not assure complete freedom of communication between computers. There is still the burden of one computer addressing another for transmission, which necessarily requires each computer to know what other computers are on the bus. But even then, the necessity of addressing individual computers becomes burdensome. What is required is autonomous computer control with the facility for not only addressing individual computers on the bus, or broadcasting to all of them, but also transmitting data to other computers based upon the type of data being transmitted, or some other criteria, as a form of limited broadcast.

An example of a typical application which would benefit from a multicomputer system operating with autonomous computer control of communications is the Voyager ground telemetry data processing system. That is currently done by computers interconnected by a Star Switch Controller (SSC). The system receives the incoming data, deblocks it, synchronizes it, and extracts science and spacecraft health data in real time. The SSC allows for a single, unidirectional data transmission link between any two of sixteen computers connected to its ports. Although operational, the SSC system has many disadvantages: all computers must be within 500 feet of the SSC; the transmitting computer must perform all the input/output protocol data handling; data cannot be broadcast to more than one receiving computer; and only 8-bit parallel data transfer can take place.

Because of the limited number of computers that can be connected and the 8-bit parallel data transfer, the SSC system is deemed quite inadequate for future missions. In addition, since the SSC is the central connection for the system, through which all data must pass during every transmission between computers, it is a single point of failure which can shut down the system. Consequently, redundant SSC's are required as backup to provide additional reliability for this centralized control organization.

The limited capability of the SSC and its vulnerability necessitated the design of a better intercomputer communication system to handle the projected increase in workload. An extensive study to seek viable alternatives to the SSC resulted in two possibilities, a global bus and a ring bus. In these network configurations, no computer is granted sole authority in managing data communications on the network, therefore improved reliability is achieved. However, a ring structure is undesirable due to additional requirements for routing and the added complexity associated with the addition or deletion of a computer to or from the network. The global bus does not necessarily entail these additional requirements and added complexity, but like the ring structure, global bus systems have in the past lacked certain desirable properties, such as having limited (group) broadcast capability and the requirement of a standard protocol.

SUMMARY OF THE INVENTION

Briefly, the present invention provides a local area network comprised of a plurality of host computers, some of which may be "intelligent terminals," each connected to a bus by a separate assigned network bus adapter. Each adapter controls the two-way transfer of data between a single computer and the common network bus, where bus access is accomplished by a contention scheme. This implies that whenever an adapter wishes to transmit data, it will make an autonomous effort to do so, if the bus is idle, without prior knowledge of the status of other units, provided there is provision for collision detection and correction. This allows for a truly distributed control; there exists no bus master and no priority is assigned to any of the adapters. Each adapter is comprised of a data processor programmed for all the data handling and communication of its host computer with the bus. It provides data buffering, such that computers operating at different speeds can send data to each other at their maximum speeds. The adapter includes means for modifying the data handling protocol of the data being transmitted to a standard one, and modifies the data handling protocol of data received to the protocol of the host computer. The bus uses high speed bit-serial transmissions over a single cable to which a plurality of adapters may be connected.

The host computer divides a message file into data blocks, the first byte of which signifies the block type. The host computer then attaches a header and trailer to every block. The header includes fields for the source and destination addresses, block position number, size and data type. The trailer includes an error detection code.

Upon receiving a block of data from a source computer, the adapter breaks it up into packets for transmission and adds to each packet a header that includes a number of fields, namely a packet position number, the data type, a control field and packet size. To each packet and packet header transmitted, the adapter adds a transport header and trailer to make up a complete frame to be driven onto the bus. The transport header includes a number of fields, namely a flag that marks the start of a frame, the frame type and two bytes reserved for addressing. The trailer includes a frame check sequence and a flag sequence that marks the start and end of every frame. The frame type field specifies one of three modes of addressing in the transmission of data, namely a physical address mode, a logical address mode and a data type mode. In the physical address mode, the two addressing bytes contain the destination address and the source address for communication between one computer and another on a one to one basis. In the logical address mode, one of the two addressing bytes contains a channel number established between the transmitting computer and one or more receiving computers. The channel number, stored by each receiving computer, may be any arbitrary number not already committed for logical addressing. For the data type mode, one of the addressing bytes contains a code identifying the type of data. Each computer in the network has stored, within its network bus adapter, a code for each type of data it is to receive. For logical addressing based on a channel number or data type, the network bus adapter of each computer checks this byte to determine whether or not the packet of data is to be received.

Communication between the host computer and the bus under control of an adapter is by direct memory access through a common memory in the network bus adapter. Associated with the host computer is a microprocessor, direct memory access controller and local memory, and associated with the bus is a microprocessor, direct memory access controller and local memory. The first microprocessor, direct memory access controller and local memory are coupled to the host computer by an interface module, and the second microprocessor, direct memory access controller and local memory are coupled to the bus by a protocol module and a front-end module. The front-end module monitors the bus to enable transmission when the bus is idle, and includes means for detecting collision between its transmitted data and data on the bus. Transmission is aborted if collision occurs, and an abort signal is transmitted. Then, after a delay, retransmission of the damaged frames takes place. The protocol module manipulates data streams onto the bus according to a standard protocol.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
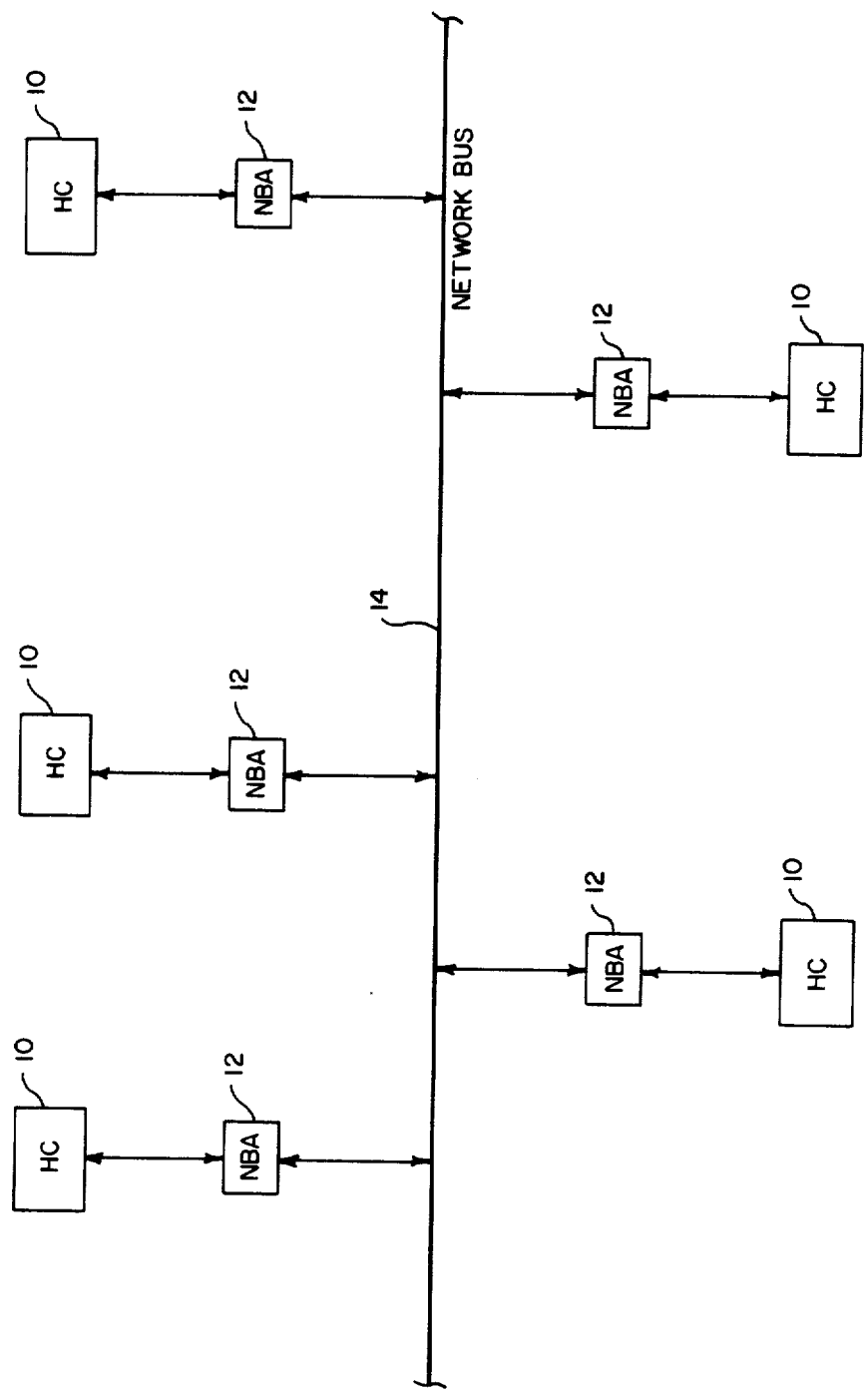
FIG. 1 is a block diagram showing a local computer network comprised of a plurality of host computers (HC) and network bus adapters (NBA) connected to a single coaxial bus.

A general description of the architectural design and requirements of a local area network according to this invention will first be presented with reference to FIG. 1. It is comprised of several host computers (HC) 10 each interfaced via a network bus adapter (NBA) 12 to a common network bus 14. Each NBA controls the two-way transfer of data between a single host computer and the common network bus where bus access is accomplished by a contention scheme. Key features of this NBA include monitoring bus availability, frame collision detection and recovery, buffering, host computer interfacing, and the facility for accepting data transmitted on the basis of its physical destination address, data type or a logical channel number, as well as general and limited broadcast. A description of the NBA, its protocol and operation is presented hereinafter with reference to FIGS. 3 through 6.

An exemplary local area network based on this bus architecture provides the following important functional capabilities. The network allows interconnection of at most 255 HCs and associated NBAs (hereinafter sometimes referred to as nodes) on the bus. It is able to accommodate variable size data blocks. Any HC in the network is able to communicate directly with any other HC without having a single point of failure which can put the entire network out of operation. An acceptable level of deterioration is achieved over a total bus length of 2 km with a data rate of 2 Mbps. The NBA does all the protocol handling, buffering and communication to the bus, thus relieving the HC of these tasks. A complete communication protocol with acknowledgement, retry provision, and cyclic redundancy checking is implemented in the NBA. The NBA provides data buffering between the HC and the bus. Data buffering allows HCs of dissimilar speeds to continuously send data between each other at maximum speed. The system is designed to provide low overhead in data communication, modular expansion, fast response, and high speed processor virtual interconnection. The network remains insensitive to configuration changes, i.e., taking a node off the bus or adding a new node to the bus does not affect the overall functioning of the system. An industry standard protocol is used. The NBA is required to have a broadcast capability, i.e., the same message can be sent to all other nodes simultaneously. Each NBA has the capability of selectively extracting packets in the broadcast mode based on allowable data type identifiers stored in the adapter. Capabilities are provided to allow the NBA to detect malfunctions in the network. Each NBA may keep statistics about error rates, usage, and trunk-conflict situations, and does provide its own network synchronization. The network is transparent to the end user and the application programmer. Each NBA has the capability of being restarted or initialized by its host computer. The host computer must be able to load programs and any necessary data tables into the associated NBA. Capabilities are also provided so that the node can send data to a selected group of nodes simultaneously. This feature is known as limited broadcast, or group broadcast.

Some of the specific quantitative network characteristics of an exemplary embodiment are: 4 Mbps cable bit rate Manchester encoded and in a digital baseband transmission mode; 256 bytes maximum nonencoded data packet size with 1.032 msec maximum packet duration on the cable; cyclic redundancy check as part of link control protocol for error control; multilayered modified International Standards Organization (ISO) High Level Data Link Control (HDLC) for network protocol; and a carrier sensed multiple access with collision detection for accessing the bus. The maximum baseband transmission distance with a single coaxial cable is 2.0 km without repeaters.

Figure 2:
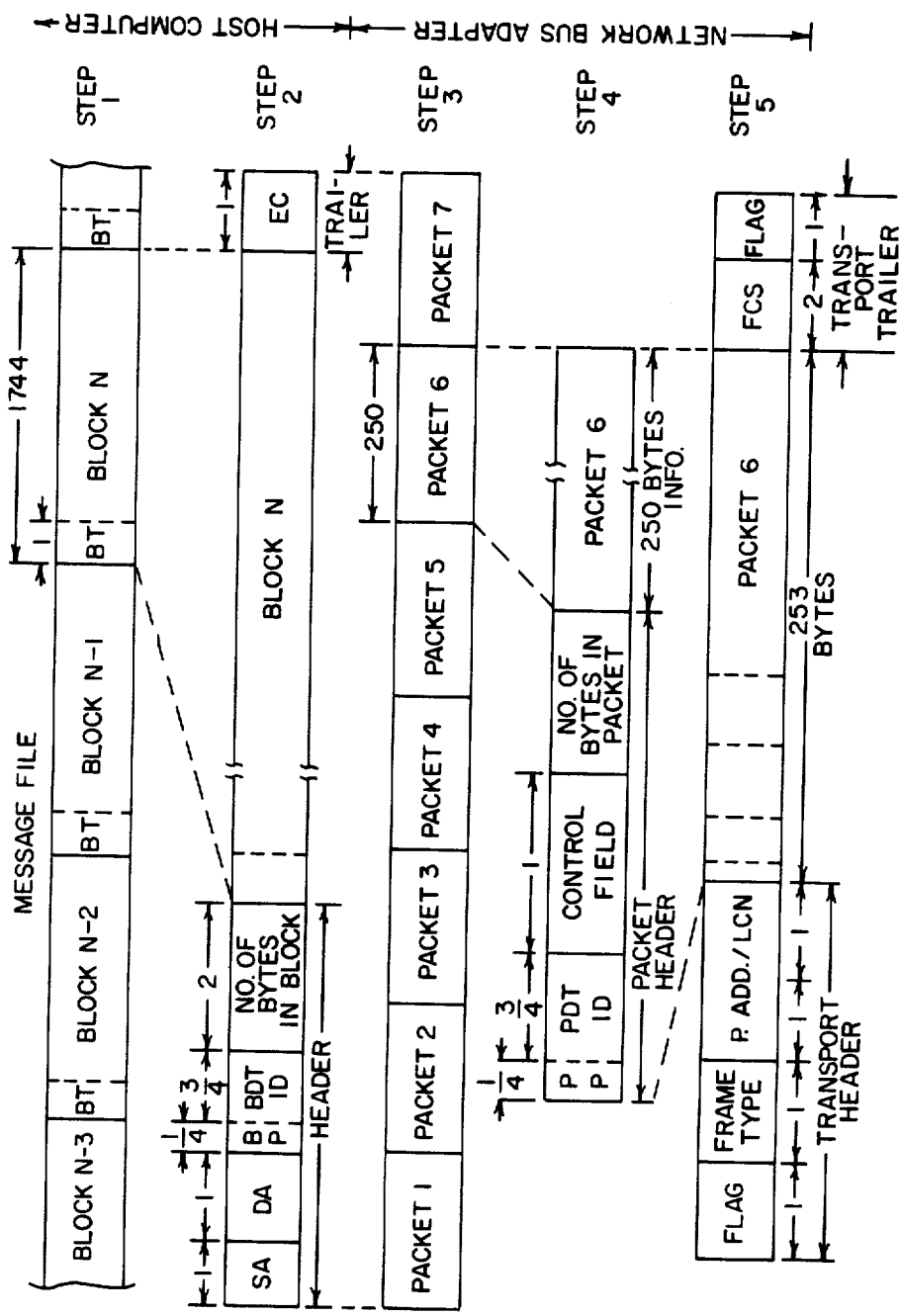
FIG. 2 is a diagram illustrating a five-step process for formatting data transmitted in the network of FIG. 1.

The steps for the transfer of data files occur at two different levels, namely at the block level in the host computer and at the packet level in the network bus adapter. FIG. 2 illustrates the basic transport steps involved in transferring a message from a host computer to its adapter, then onto the network. The following abbreviations have been used in FIG. 2:

BT—Block Type
SA—Source Address
DA—Destination Address
BP—Block Position
BDT ID—Block Data Type Identifier
EC—Error Control
PP—Packet Position
PDT ID—Packet Data Type Identifier
P.Add./LCN—Physical Address or Logical Channel Number Address The transmitting host computer breaks the message into smaller blocks, each block being 1744 bytes maximum, puts a header in front of the block and transfers the block to its adapter in the format shown in step 2 (FIG. 2). The adapter then breaks a block into an appropriate number of packets, attaches a packet header and transport header before transmitting to the bus as shown in steps 3, 4 and 5. Source and destination address at the block level are the physical channel numbers associated with the transmitting and the receiving host computers. Block position field is a two-bit field identifying its position in the message relative to other blocks, as follows:

00 Beginning of new message
01 Continuation of previous message
10 Last block of the message
11 First and only block of the message Block data type identifiers will identify the nature of the block being transmitted to the adapter. For example, seven block types are:

1. Regular data block. These blocks are the most general type of block encountered. Each consists of the actual data that has to be transferred to only one other computer.
2. Broadcast data block. In the general broadcast mode, every computer on the network receives the data.
3. Limited broadcast block. This block implies that data in the information field will be broadcast to a group of computers as specified in the beginning of the information field.
4. Broadcast data with data type identifier. This block allows the transmitting computer to broadcast special types of data distinguished by a certain identification field inside the packet. The network bus adapter can accept data associated with a number of data type identifiers.
5. Common block. This block consists of commands issued by a computer to its adapter or vice versa. Typical examples are initialization of the system, retrieval of error statistics, reading the adapter memory, and polling of all computers on the network. The specific command will be contained in the first byte of the information field of the packet.
6. Flow control block. These are blocks of information required to perform handshakings at the computer level.
7. Interrupt block. This block is a special block only one packet long. Its purpose is to transmit the priority block to the destination ahead of the blocks queued within the transmitting adapter.

Block header information is inserted by the host computer before the block is transferred to the adapter where it is divided into packets. At the packet level, upon receiving a block of data, the adapter breaks the block into small segments and attaches transport header information, as shown in steps 3, 4 and 5 of FIG. 2 before the frame is transmitted over the coaxial cable to other receivers. All transmitted frames conform to the International Standards Organization High Level Data Link Control protocol with the exception that immediately after the flag starting sequence, the first eight bits are used for frame type identification instead. There are three modes of addressing, namely physical addressing mode, logical addressing mode and data type addressing mode. The frame type identifier (ID) is used to classify the frame. The following six types of frames are exemplary.

1. Calls establishment frames (includes call request, call acknowledge, and clear request packets). Call establishment packets send call control information between the host system and the network to establish and terminate the virtual circuits.
2. Flow control frames. Flow control frames are used to perform link supervisory control functions such as acknowledgement of information frames, request retransmission of information frames, and request temporary suspension of transmission of information frames.
3. Interrupt frames. Interrupt frames are used to transmit the priority packet to the destination ahead of all the pending messages queued to the particular receiver. There can only be one interrupt frame pending to a particular logical channel at any time. Other interrupt frames can be issued only if the previous one has been acknowledged. The receiving terminal would acknowledge the interrupt frame immediately upon its receipt. The message sequence number (a part of the Control Field as in HDLC standards) are not modified as a result of transmission and acknowledgement of this type of frame.
4. Information frames. Information frames are used to perform information transfer from a source computer to a destination computer, using the physical addressing mode.
5. General broadcast frames. An adapter has the capability to transmit a packet to all remaining computers on the network in a single call using a physical addressing mode, without having to specifically address each computer.
6. Broadcast frames with data type identifier. A broadcast frame with a special ID allows the transmitting node to broadcast the data and provide an identification field associated with the data inside the packet. Each adapter accepts only packets having specified data identification fields. This capability allows the computers in the network to receive only specific data packets from a data stream being broadcast by a single computer without burdening itself by receiving all the data and then deciding which data was intended for it.

7. Limited (group) broadcast frames with logical address. An adapter has the ability to transmit packets to a selected group of computers on the network after first establishing a logical channel link.

A physical address is one which specifies a destination, where the destination is a particular computer or all computers within the network. If there is an information frame, the address of a particular computer will follow and the next field will contain the address of the source computer so the destination computer may acknowledge. If there is a limited broadcast frame, a two-byte logical channel number (LCN) will follow, which is an arbitrary number agreed upon by two or more computers to identify a channel link for their communication. Once the LCN is established, there is no need to include the address of the sending and the receiving computers in the header of every frame transmitted. If there is a broadcast frame with a data type identifier, each adapter will look at received data and accept only data of the type it has been required to accept.

Figure 5:
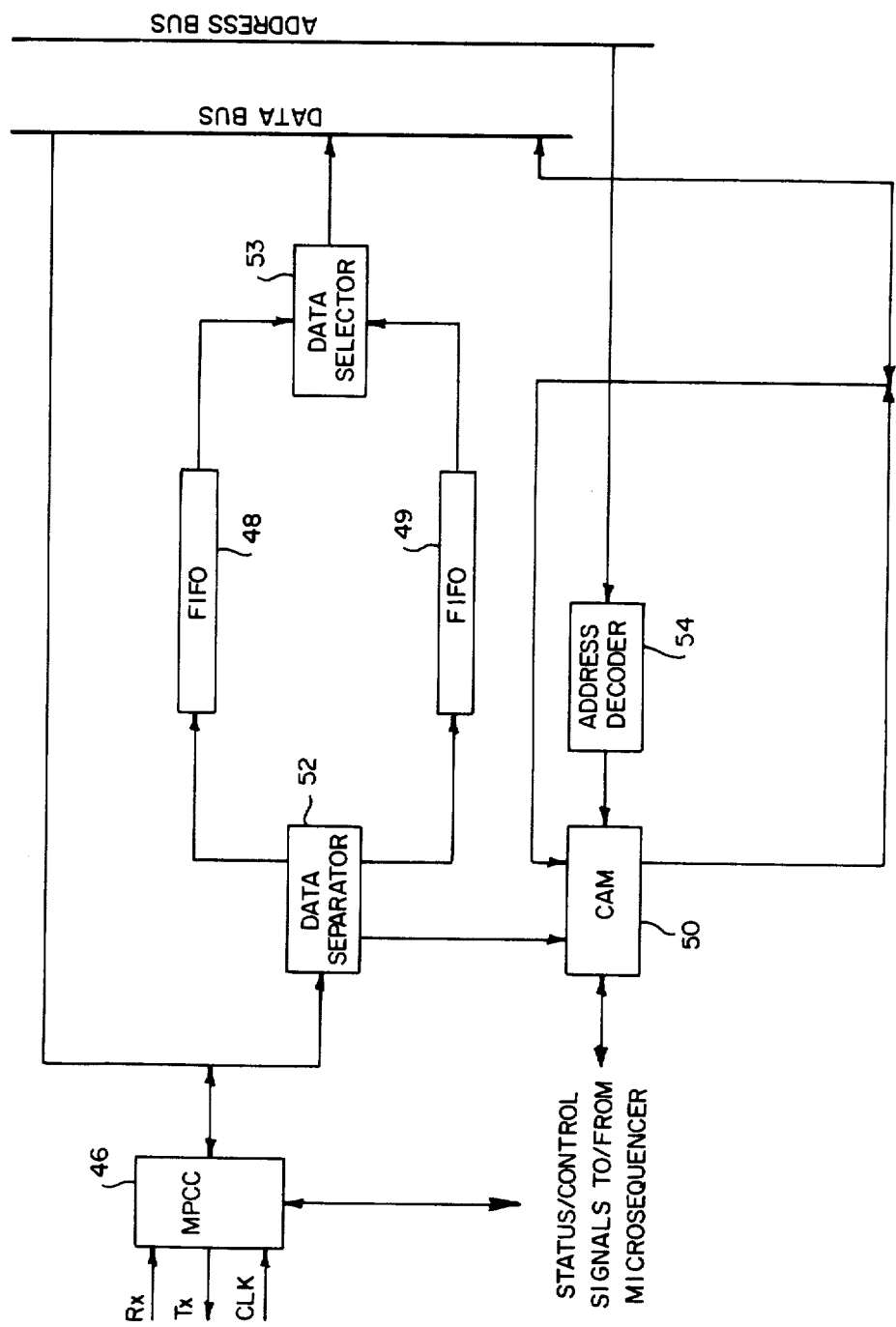
FIG. 5 is a block diagram illustrating the architecture of a protocol module in the NBA of FIG. 3.

The address decoding function is carried out by matching the physical, logical or data type address field with a code (data) stored in any one of a number of memory locations of a content addressable memory 50 (FIG. 5). In that way, the address code is simultaneously compared with all codes in these locations. The microprocessor 21a will write the usable codes as required into the content addressable memory under the command of its host computer.

A two-bit field associated with the packet identifier indicates the position of the packet in the block similar to the block position field described earlier. A frame could have a maximum of 250 bytes of data in the information field. All frames start and end with the flag sequence. The data in the frame is protected by frame check sequence, generated and checked by the hardware.

Figure 3:
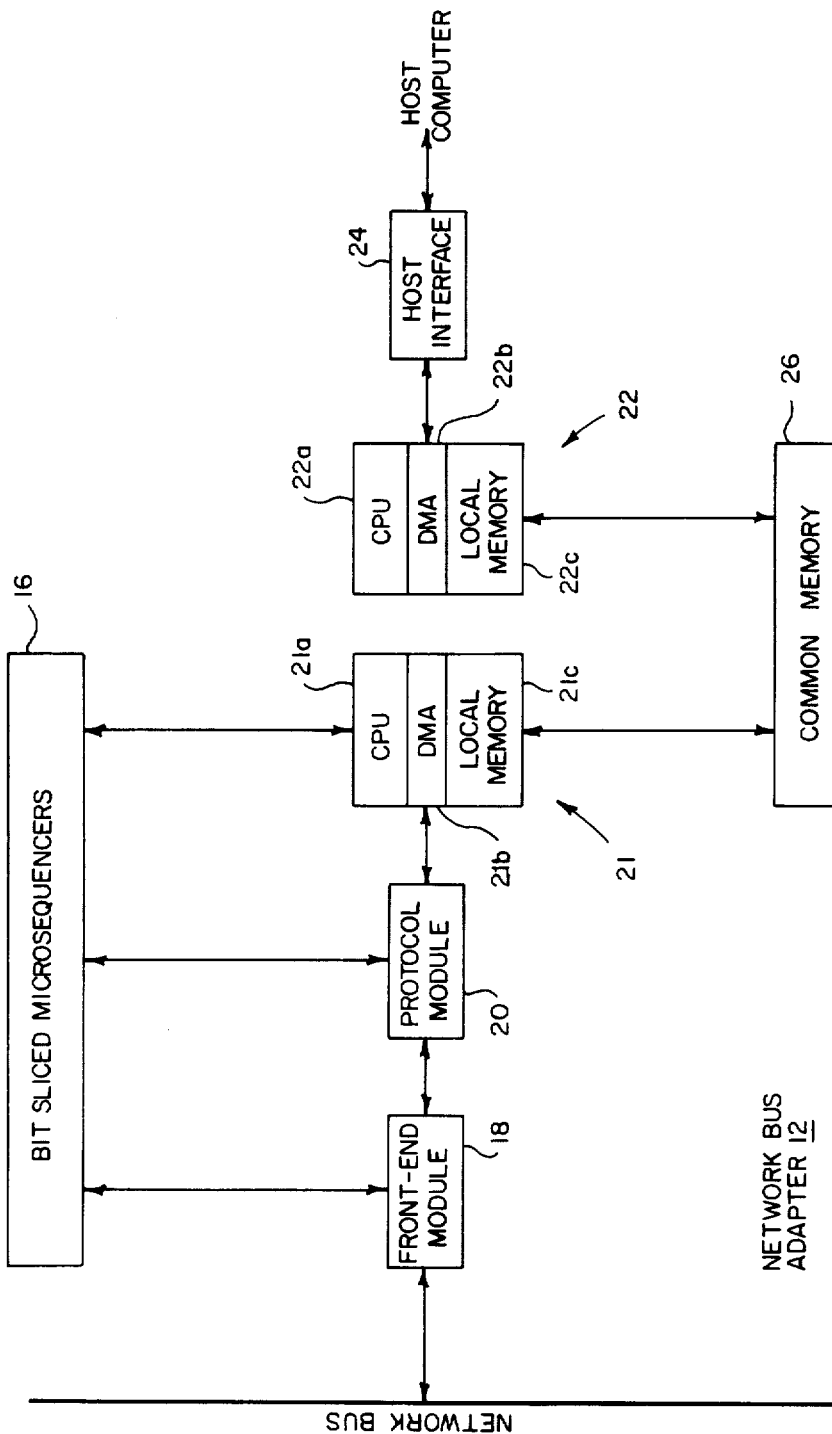
FIG. 3 is a block diagram illustrating the architecture of an NBA in the network of FIG. 1.
Figure 7:
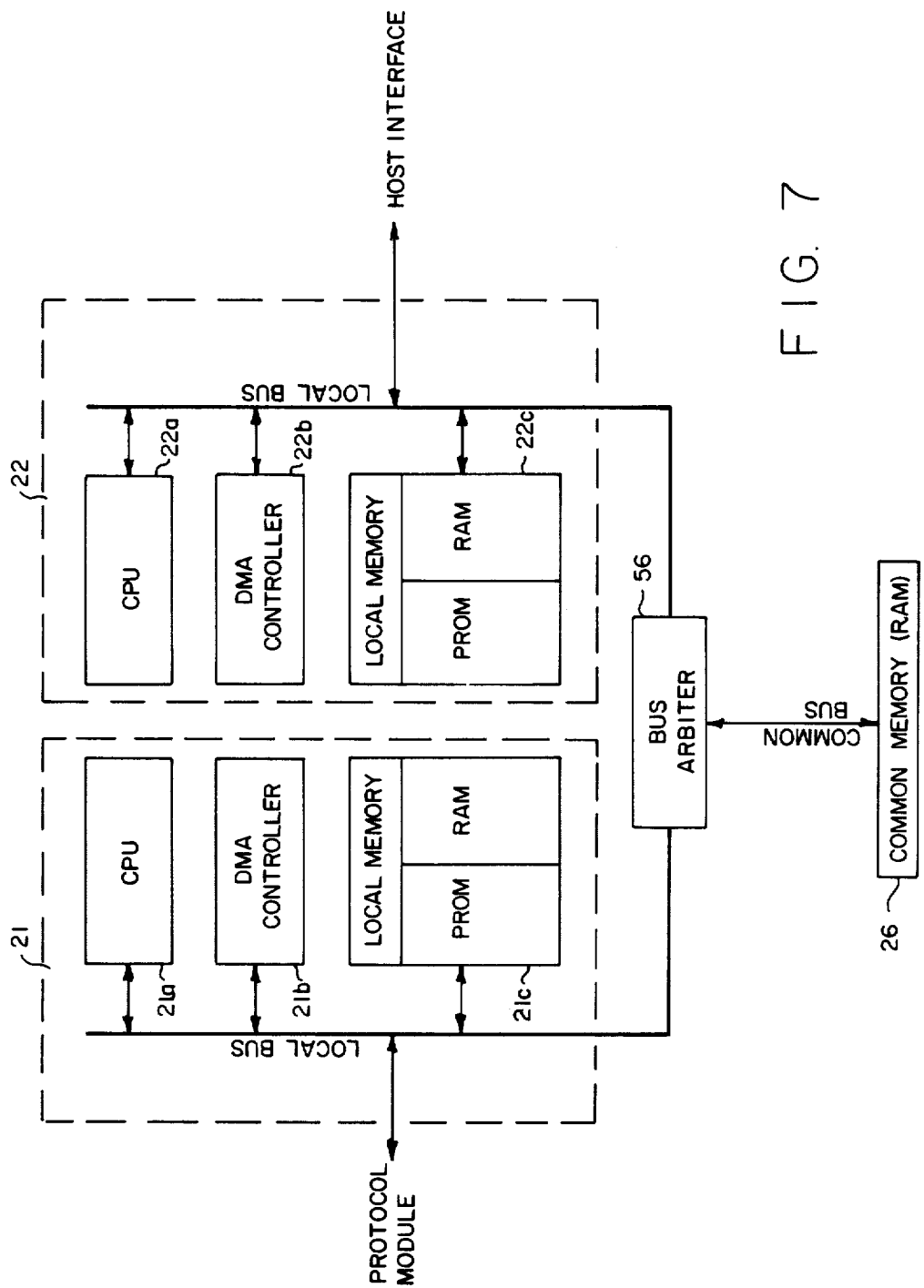
FIG. 7 is a block diagram illustrating the architecture of the dual microprocessor configuration shown in the NBA of FIG. 3.

From the foregoing description of the network, it is evident from FIG. 3 that the network bus adapters are intelligent interfaces which receive and transmit data onto the bus, and transfer data to and from the host computer at the other end. Control of the network bus adapter is through a bit-sliced microsequencer 16 which controls a front end module 18, a protocol module 20, and a processor 21 comprised of a microprocessor (CPU) 21a connected to a direct memory access controller 21b and a local memory 21c. Communication with the host computer is through a processor 22 comprised of a microprocessor 22a, direct memory access controller 22b and a local memory 22c. An interface 24 actually connects the host computer to the local bus of the microprocessor 22a, direct memory access controller 22b, and local memory 22c, as shown in FIG. 7. It is to be noted that the host interface module is the only module which would be unique to each different type of computer. The two processors 21 and 22 have access to a common memory 26. All of these functional blocks are implemented with commercially available integrated circuit chips. For example, the microprogram sequencer 16 may be an AM 2911A, the direct memory access (DMA) controllers 21b and 22b may each be a multimode DMA controller AM 9517A, and the microprocessors may be AM Z8002.

A dual microprocessor architecture that shares common memory besides its own local memory is considered to be the most appropriate method to handle the required exchange and manipulation of information. All transfers of data packets to and from these memories as well as to the host computers are by direct memory access.

Figure 4:
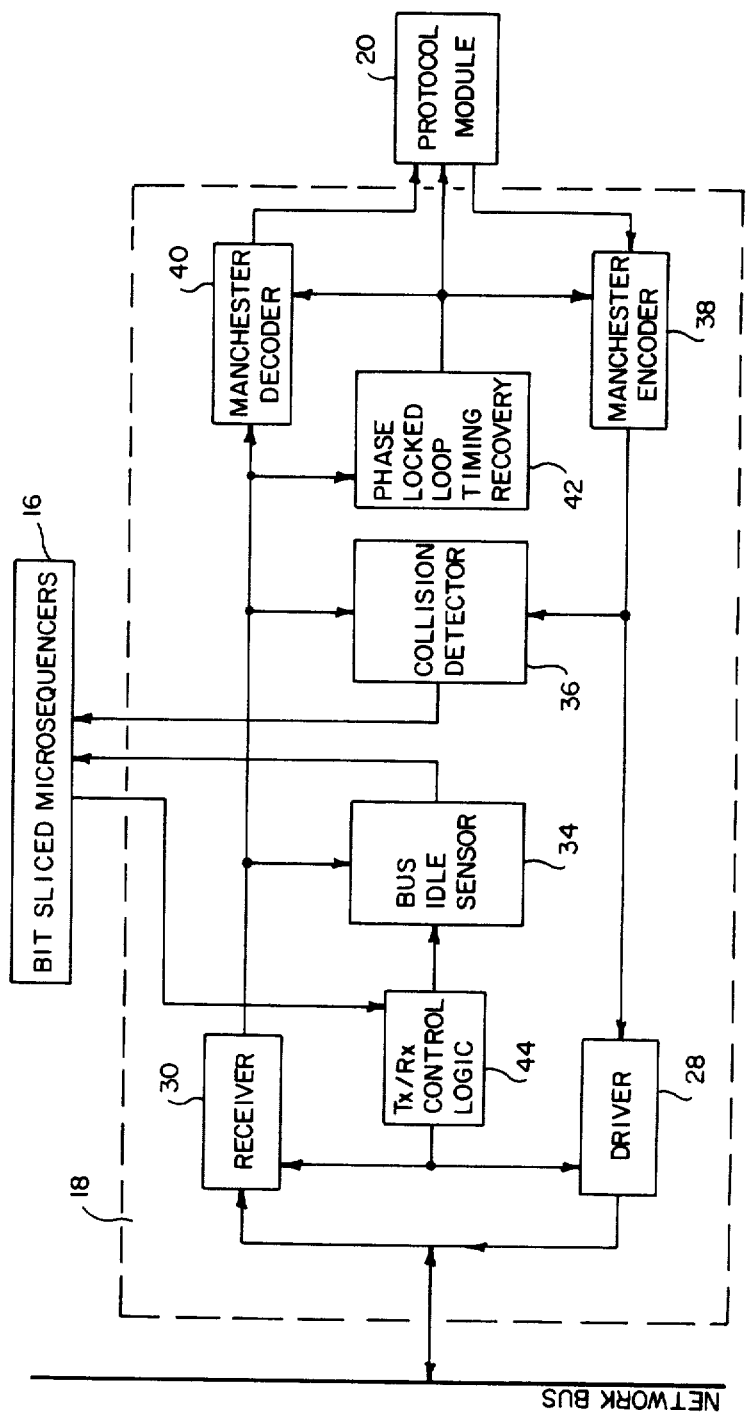
FIG. 4 is a block diagram illustrating the architecture of a front-end (transmit-receive) module in the NBA of FIG. 3.

The front-end module 18 shown in FIG. 4 is responsible for the lowest level of interaction, namely the electrical connection to the network bus. It is composed of a bus driver 28 and a receiver 30, both coupled to the bus, a bus idle sensor 34, a collision detector 36, a Manchester encoder 38 and decoder 40, and a phase locked loop timing recovery circuit 42.

Comparison of various digital baseband signaling techniques led to the choice of the biphase-level data encoding commonly known as the Manchester code. Clock information is readily available from the signal because there is at least one amplitude change every bit period. This property of having a transition occurring at the middle of each bit-time is also used to identify whether there is any traffic currently on the network bus. Extraction of the clock signal from the encoded data is performed by a Phase-Locked Loop (PLL) circuit which locks on the frequency of the incoming bit stream. The output of the PLL oscillator is also used during transmission.

The bit-slice microsequencer 16 (FIG. 3) controls a transmitter/receiver (Tx/Rx) control logic 44 (FIG. 4) for the transmission and reception of data. It should be recalled that the receiver will receive both signals on the bus from some other network bus adapter and from the driver 28 so that the collision detector 36 may determine if a conflict exists with data already being transmitted on the bus. This may occur if the bus idle sensor 34 determines the bus is idle and signals the microsequencer to transmit when ready and at the same time another network bus adapter begins transmission, it too having found the bus idle. The result will be that both network bus adapters will detect a conflict and signal their microsequencers which will in turn stop the transmission. Collisions are detected using a high speed sampling voltage comparator to match outgoing and incoming waveforms. A mismatch signifies a collision. Once the transmission is aborted due to a collision, the microsequencers will then cause a delay (random or pseudorandom) before attempting to again transmit. Consequently, one of the two will again attempt to transmit before the other has reached the end of its time delay. In that way one will acquire the bus to the exclusion of the other, with neither having priority.

An example of this technique for not only sensing when the bus is idle, but also avoiding collision of data on the bus, due to one computer attempting to transmit data over the bus while another computer has data on the bus, is disclosed in U.S. Pat. No. 4,063,220 to Metcalfe, et al., assigned to Xerox Corporation.

The main feature of the protocol module 20 shown in FIG. 5 is to manipulate data streams according to the International Standards Organization (ISO) High Level Data Link Control (HDLC) protocol. In essence, framing and deframing of data packets are being performed by protocol module which also gives information on any abnormalities in the frame such as cyclic redundancy check error, length of the frame error, etc., such that appropriate recovery action can be initiated by the microsequencers.

The basic block diagram of the protocol module consists of a multiprotocol communications controller (MPCC) 46 commercially available as an integrated circuit (SIGNETICS 2652), a pair of FIRST-IN FIRST-OUT (FIFO) memory buffers 48 and 49, and content addressable memories (CAM) 50 for logical address and possible data type matchings.

The Signetics 2652 Multi-Protocol Communication Controller (MPCC) is a Large Scale Integrated (LSI) circuit that formats, transmits, and receives synchronous bit-oriented protocols. This chip operates at a maximum of 2 Mbps. It performs the complex data communication link function for the High Level Data Link Control (HDLC). Among some of the many features it possesses: automatic flag detection and synchronization; zero insertion and deletion; abort signal detection and transmission; cyclic redundancy check (CRC); and loop back self test mode. The data from the MPCC to the FIFO is converted from serial to parallel by the MPCC. Parallel data from a data bus within the network bus adapter is converted from parallel to serial by the MPCC when in the transmit mode. The content addressable memory 50 is connected to the data bus, and could be loaded and read out as necessary. For that purpose, it is addressed by codes received at an address decoder 54 from the CPU 21a (FIG. 3) over an address bus. Both the content addressable memory 50 and the MPCC transmit and receive status and control signals to and from the microsequencer 16 (FIG. 3).

Due to the fact that there is no control on the incoming bit streams, a complete frame has to be saved in one of the FIFOs before being transferred to the common memory 26 (FIG. 3) using direct memory access. (The FIFOs are used alternatively under control of a data separator 52 and data selector 53 so while one is being filled, the other is being emptied.) This same condition does not exist when the system is in the transmit mode. The MPCC can directly accept the data without any buffering. Content addressable memories, also known as associative memories, are being used in order to allow simultaneous comparison between certain bytes in the frame header and the existing logical channel numbers, physical destination address or the data type identifier in a table stored in the content addressable memories. Sequential comparison is not possible because of the critical timing constraints.

Figure 6:
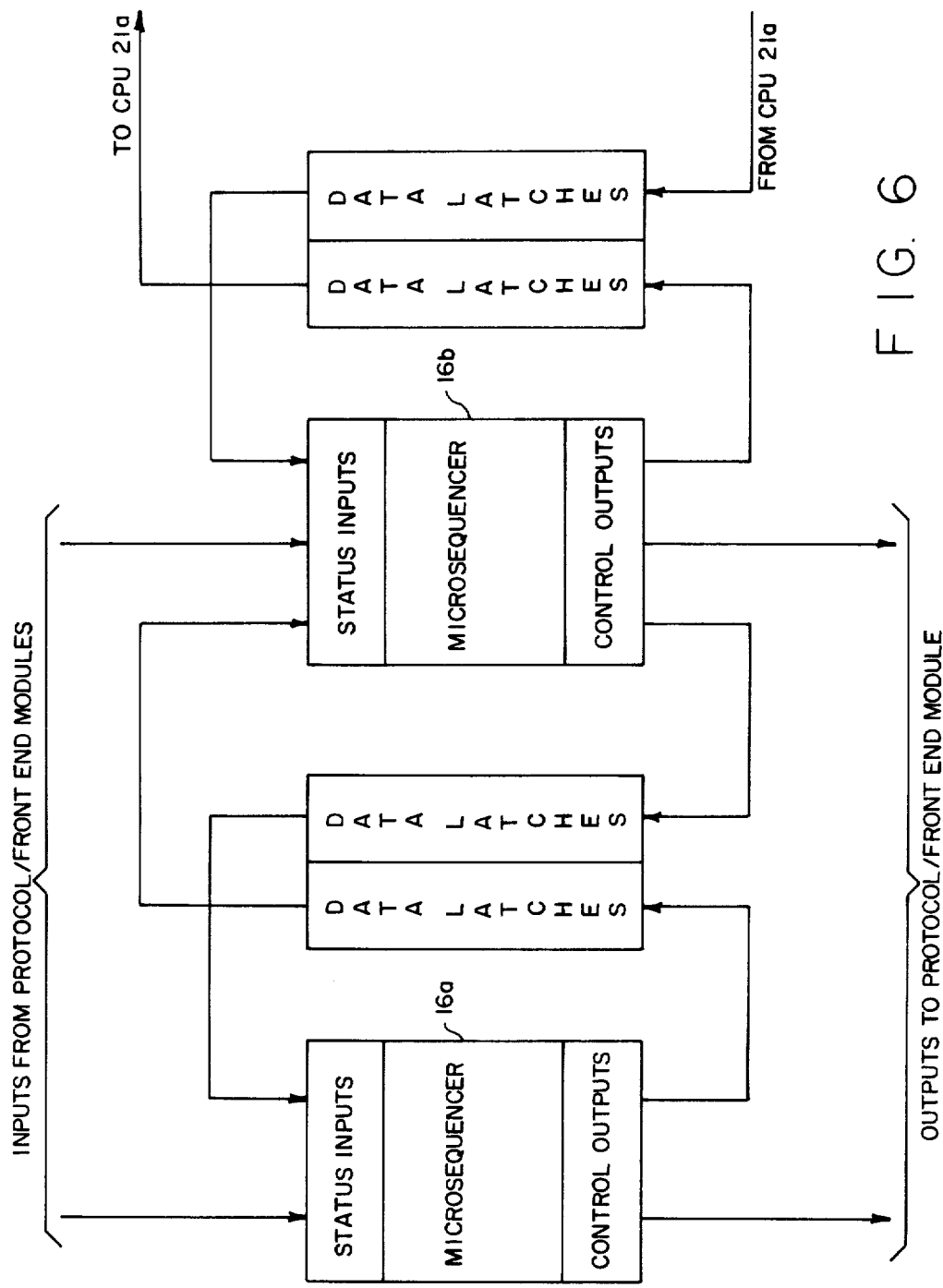
FIG. 6 illustrates the manner in which two microsequencers are used in the NBA of FIG. 3.

Status monitoring and control of logic elements using microprocessors has been rejected in favor of the microprogrammable bit-sliced sequencer 16 because the latter can operate at a much higher speed. In practice, microsequencers 16a and 16b are used in a limited handshaking mode to allow synchronization of overall subsystem operation as shown in FIG. 6.

Besides sending out control signals to the various logic elements that perform the latching and routing of data, these microsequencers are also used to sense certain status signals such as network bus busy, collision detected, mismatch occurring in CAMs, and requests by the CPU to change from receive mode to transmit mode. Each of these conditions will generate specific responses at the control bits of the microsequencer outputs. Each microsequencer consists of two four-bit slices (commercially available AM 2911A) in order to accommodate a maximum of 256 microprogram statements.

The dual microprocessor portion of the network bus adapter is organized as shown in FIG. 7. It performs such functions as establishing, controlling, and disconnecting virtual circuits; processing of host computer commands; and management of data transfers. In this particular design shown in FIG. 7, enhanced performance is achieved through partitioning of overall system functions into tasks which two processors can handle in parallel. The first microprocessor 21a handles the data transfers between the protocol module and the common memory, and the second microprocessor 21b is responsible for the traffic between the common memory and the host computer via the interface module.

Bus arbiter 56 gives priority to the first microprocessor 21a in case of simultaneous bus requests due to its assigned task of handling unpredictable arrivals of incoming data streams. A bus arbiter 56 either specially designed or implemented with a (commercially available Intel 8289) performs this function. Once a microprocessor gets control of the system bus, it will have exclusive use until it voluntarily releases it. Each local memory 21c and 22c consists of 16K bytes of programmable read only memories (PROM), 48K bytes of random access memories (RAM), out of which 32K bytes are shared by both the microprocessors as the common memory 26, thus allowing high speed memory to memory transfer and direct access to the common memory from the protocol module 20 and the host interface module 24.

Figure 8:
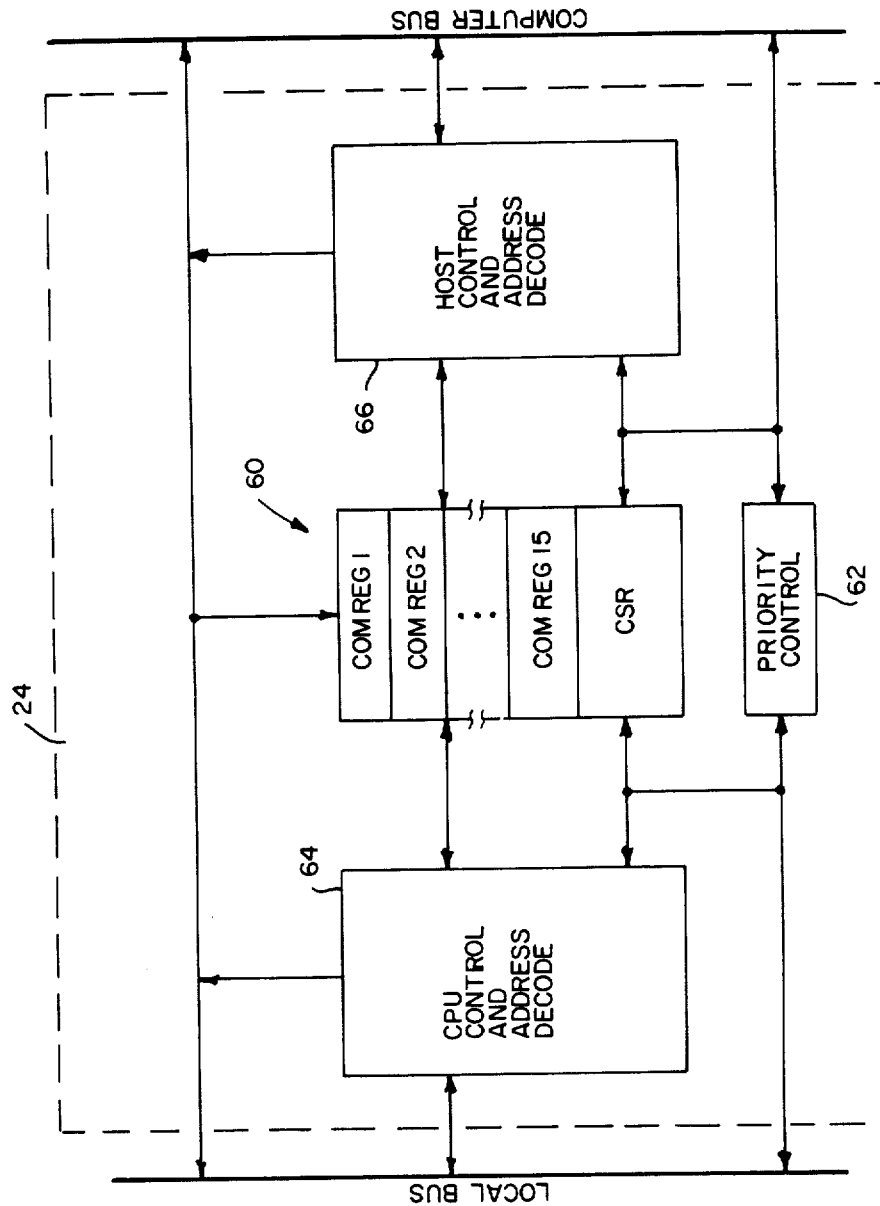
FIG. 8 is a block diagram illustrating a host interface shown in the NBA of FIG. 3.

The host interface module 24 has to be custom designed to fit each specific host computer. The design should support four levels of vector interrupt. FIG. 8 illustrates an exemplary architecture for a host interface module. Through programmed I/O, sixteen 16-bit registers 60 can be written into, or read from, by either the microprocessor 22a or the host computer. Intercommunication is performed via four of the described registers designated communication registers (COM REG) 1 through 15, whereas the sixteenth is principally used for interrupt handling and is a command-status register (CSR).

A priority control unit 62 monitors a microprocessor interrupt signal and a host interrupt signal to control access to the memory through a microprocessor control and address decode unit 64 and a host control and address decode unit 66. The CSR is updated to indicate at all times which has access.

In summary, the interactions between various modules in the network bus adapter can be clearly demonstrated by following the flow of data through the adapter, shown in FIG. 3 suplemented by FIGS. 4–8. The driver and receiver in the front-end module drives and receives data to and from the network bus cable at 4 Mbps using Manchester encoding technique and converts the cable's baseband signals to binary nonreturn to zero (NRZ) codes at 2 Mbps. In the receive mode, bit streams enter the front-end receiver 30 from the network bus. The Manchester decoder 40 and supporting logic extracts the binary NRZ data out together with the synchronization clock signals. During this period, the collision detector 36 is inactive and relies upon the transmitting node to give notification of any damaged frames by sending abort signals.

The resulting data bit stream is passed on to the protocol module 20 which extracts some of the HDLC transmission overheads, such as flags, excess zeros, and cyclic redundancy check codes. Comparison of certain fields in the header are made with the contents of the associative memory 50 to determine whether the particular packet should be accepted or not. When an appropriately addressed packet is recognized, it is received into one of the FIFOs, each of which is large enough to hold a full frame. Consecutive frames are alternately loaded into the FIFO 48 and the FIFO 49. Packets damaged as a result of a collision are automatically removed from the FIFO. Once a packet is loaded, the CPU 21a will initiate a DMA transfer from the FIFO to its local memory 21c where inspection of the header takes place. Out of sequence frames are rejected, and supervisory frames are given appropriate responses. Only data frames are to be transferred using the DMA to the shared memory 26 accessible to CPU 22a. This data is subsequently transferred directly to the host computer via the host interface module 24 after depacketization.

In the transmit mode, the host computer sends its data blocks to the local memory of the CPU 22a where they are broken into smaller packets and transferred into the shared memory 26. CPU 21a will access the common memory 26 in order to put the updated frame sequence number in the control field before initiating another DMA transfer to the protocol module 20. Bit serial data coming out of this protocol module 20 will have all the required characteristics of a typical HDLC frame. These bit streams are subsequently Manchester encoded before being transmitted onto the network bus.

Throughout this transmit period, the collision detector 36 monitors the network bus for any signal contamination which might occur as a result of another node attempting to transmit simultaneously. If a collision is detected, the microsequencer 16 will halt the transmission. The multiprotocol communications circuit 46 (FIG. 5) then sends an abort signal onto the network bus to notify other nodes that a collision has occurred. The transmitting adapter generates a random or pseudo-random delay and attempts retransmission only after the delay has elapsed.

Greater reliability through decentralized control is one of the major design criterion that underlies the concept of this bus structured organization. The failure-reconfiguration characteristics of this architecture are useful in a real-time applications environment where excessive reconfiguration delays must be avoided. The design uses high speed bit-serial transmissions over a single cable. Each host computer is connected onto the bus via an assigned network bus adapter.

A protocol module in the adapter manipulates data streams according to the International Standards Organization (ISO) High Level Data Link Control (HDLC) protocol. In essence, framing and deframing of data packets are performed by the module which also gives information on any abnormalities in the frame such as CRC error, length of the frame error, etc., so that appropriate recovery action can be initiated by the microsequencer.

Although a particular embodiment of the network bus adapter has been described and illustrated herein, it is recognized that modifications and variations may readily occur to those skilled in the art. It is therefore intended that the claims be interpreted to cover such modifications and variations.

What is claimed is:

1. In apparatus for communication between a plurality of autonomous computers operated in a local area network using multimode addressing, each computer being connected to a single bus by a separate assigned network bus adapter, each adapter having a stored address code for each type of data it is to receive, each adapter comprising a data processing means programmed for carrying out all data handling and communication of its host computer with the bus, said processing means including means for data buffering, such that computers operating at different speeds in accordance with its protocol can send data to each other at their maximum speeds, an interface connecting said host computer to said processing means, protocol handling means connected to said data processing means for modifying the data handling protocol of the data being transmitted by said data processing means to a standard protocol and the data being received by said data processing means to the protocol of the host computer, means coupled to said protocol handling means for driving onto said bus data to be transmitted and for receiving data on said bus, and microprogrammed sequencing means for coordinating operation of said processing means, said protocol handling means and said transmitting and receiving means, whereby each adapter is a self-contained, autonomous unit for the protocol handling and network management of the data communications between any two or more computers wherein data transmitted is divided into packets by said processing means of the adapter assigned to the transmitting computer, an improvement comprising said processing means providing each packet with a first uniquely encoded field, each adapter provided with means responsive to said first uniquely encoded field for identifying the address code being used by each packet, said processing means providing each packet with a second uniquely encoded field said protocol handling means having means responsive to said second uniquely encoded field for identifying a mode selected from the group consisting of a first mode, a second mode and a third mode, said protocol handling means having means responsive to said first mode for identifying said second uniquely encoded field as a physical destination address code identifying one or more of the computers for an information frame specified by said first encoded field, said protocol handling means having means responsive to said second mode for identifying said second uniquely encoded field as a logical channel number, LCN, pre-established between two or more computers, and means responsive to said identification for establishing a logical channel number with said two or more computers and allowing communication therebetween without physical destination addressing, said two or more computers being able to communicate after establishment of said logical channel number using said logical channel number as an address to which said two or more computers respond without physical destination addressing for a broadcast of information to said two or more computers specified by said first encoded field, said protocol handling means having means responsive to said third mode for identifying said second uniquely encoded field as a data type identification code, and means responsive to said identification for permitting transmission of different types of data onto said bus without physical destination addresses and for permitting one or more computes to selectively receive data according to the type of data, thereby providing for a broadcast of data by type as specified by said first uniquely encoded field, whereby data transmitted onto said bus is selectively accepted by different computers according to said first and second uniquely encoded field.

2. Apparatus as defined in claim 1 including means for storing codes and means for decoding said second unique field by comparison of said second unique field with all stored codes simultaneously in search of a match.

3. Apparatus as defined in claim 2 wherein said storing and decoding means is comprised of a content addressable memory addressed by said second uniquely encoded field.

4. Apparatus as defined in claim 1 wherein said second uniquely encoded field is comprised of two bytes, and these two bytes specify a physical destination address and source address or a logical channel number.

5. Apparatus as defined in claim 1 wherein said data processing means is comprised of two microprocessors, each with a local memory, and each sharing a common memory, one microprocessor being coupled to a host computer by said interface and the other microprocessor being coupled to said protocol handling means, said one microprocessor having means for receiving data from or transferring data to said host computer through said host interface at one rate, said other microprocessor receiving data from or transferring data to said network bus at a predetermined rate independent of said one rate through said protocol handling means, and said two microprocessors receiving data from or transferring data to one another through said common memory.

* * * * *